Feb. 15, 1938.  E. WILDHABER  2,108,244
METHOD OF CUTTING GEARS
Filed Feb. 1, 1936  2 Sheets-Sheet 1

Inventor
Ernest Wildhaber
By
[signature]
Attorney

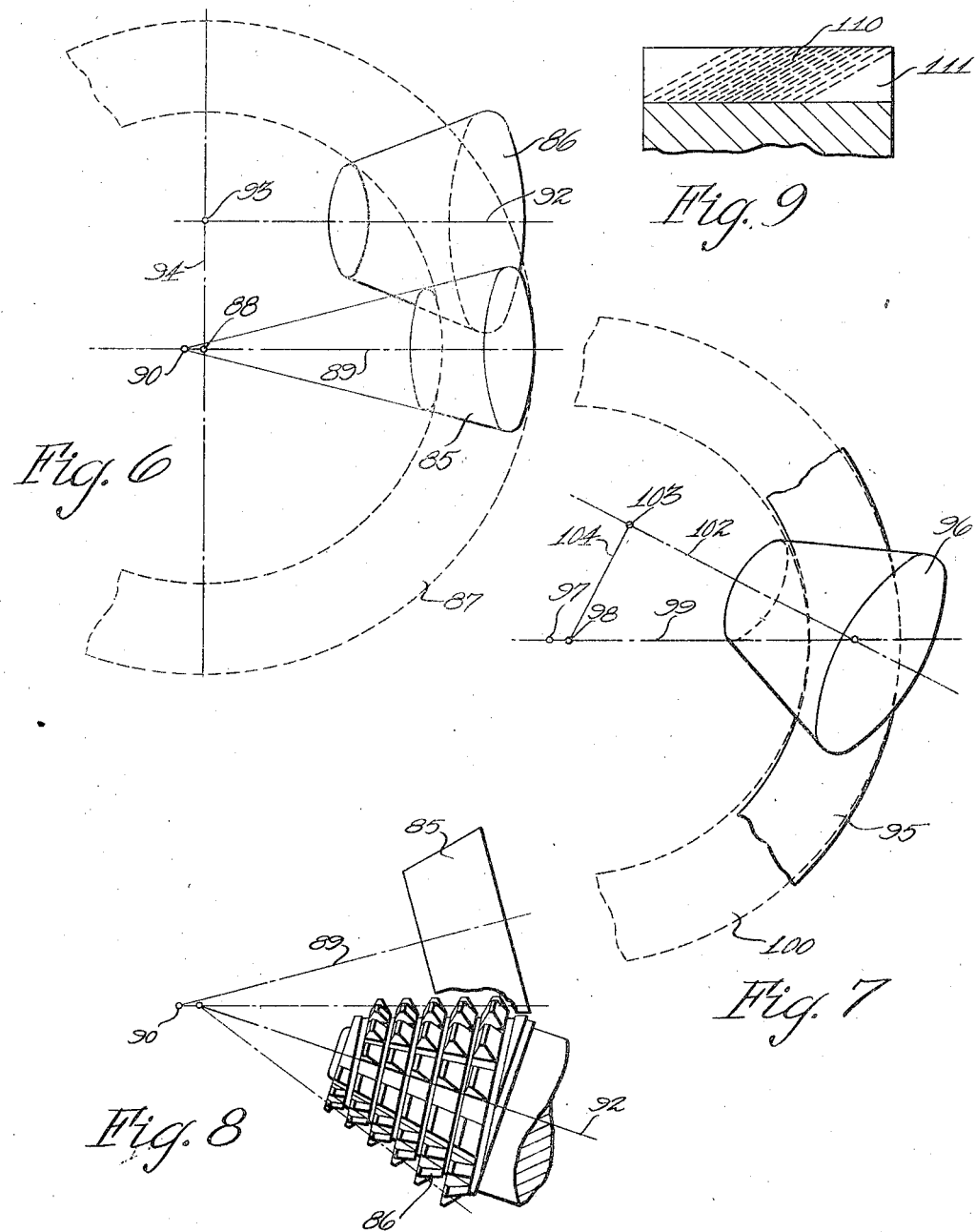

Patented Feb. 15, 1938

2,108,244

UNITED STATES PATENT OFFICE 2,108,244

METHOD OF CUTTING GEARS

Ernest Wildhaber, Irondequoit, N. Y., assignor to Gleason Works, Rochester, N. Y., a corporation of New York Application February 1, 1936, Serial No. 61,981

9 Claims. (Cl. 90—4)

The present invention relates to the production of longitudinally curved tooth tapered gears and particularly to methods of cutting longitudinally curved tooth bevel gears which have teeth of general involute lengthwise tooth curvature or of a lengthwise tooth curvature closely approximating the involute. In the terms "general involute lengthwise tooth curvature and approximate involute lengthwise tooth curvature" are comprehended true involutes and so-called modified involutes as well as gears whose teeth are curved along circular arcs in development, the radii of which are such that the tooth curves for the length of the gear teeth approximate very closely involutes or modified involutes.

Experience has taught that gears which are to be used in the rear axle drives of automotive vehicles must be capable of some adjustment relative to one another so that they may accommodate themselves to the variations in mountings and loads which are encountered in the use of such gears. To secure the necessary adjustment, the gears must mesh with less than full length tooth contact.

Heretofore no satisfactory method has existed for cutting gears of general involute lengthwise tooth curvature so that they will transmit uniform motion and at the same time have less than full length contact. Hence, the only satisfactory form of gear developed for rear axle use has been the type in which the teeth are curved longitudinally along circular arcs in development. A pair of such gears may be cut so that their mating tooth surfaces have different radii of tooth curvature and contact, therefore, only along a limited portion of their length. This limited contact or tooth bearing permits of adjustment in assembly of the gears and also allows the gears to accommodate themselves automatically to variations in load in use.

For years, attempts have been made to introduce hobbed spiral bevel gears into the automotive field but without any real success. One of the principal objections to the use of such gears has been their lack of adjustment. Various methods have been advanced to provide this adjustment. Thus, it has been proposed to hob the gears with a hob of special form made to cut teeth on the gears which are of different thickness at their centers than at their ends, but such a hob is only correct theoretically for one particular set of gears and it has but little practical range of adjustment. Moreover, if the tooth bearing produced proves unsatisfactory in use, there is no remedy but to use a different hob or attempt to re-grind the old hob. Either proposition is costly and impractical.

It has also been proposed to secure a localization of tooth bearing by hobbing spiral bevel gears so that they are conjugate to tapered gears rather than to true crown gears, but this method leads to unsatisfactory complications in the design of the hobbing machine.

Broadly, the purpose of the present invention is to provide a method of cutting gears which have involute or approximate involute lengthwise tooth curvature so that such gears will transmit uniform motion while meshing with a localized tooth bearing.

A more specific object of the present invention is to provide a method for hobbing spiral bevel gears so that they will have a localized tooth bearing and which will avoid the limitations and restrictions of such methods as have heretofore been proposed for this purpose. In this connection, it is the purpose of the present invention to provide a method for hobbing spiral bevel gears with a localized tooth bearing which will not require use of any special form of hob or any special form of hobbing machine, but which may be carried out on existing forms of machines and with standard hobs.

Another object of the invention is to provide a method of hobbing spiral bevel gears which will produce gears that are stronger than gears as hobbed by the methods of hobbing ordinarily practiced heretofore.

Other objects of the invention will be apparent hereinafter from the specification and from the recital of the appended claims.

With the present invention, instead of generating both members of a spiral bevel gear pair conjugate to basic crown gears whose axes intersect the axes of the gear blanks in their cone apexes, as has been the practice heretofore, the two members of a spiral bevel gear pair are generated conjugate to crown gears whose apexes are offset from the apexes of the blanks and whose axes may also even be offset from the blank axes.

The present invention may be practiced simply by advancing or withdrawing the gear blank axially on a gear generating machine so that it will be adjusted to have its apex offset from the axis of the cradle of the machine, and then producing a relative rolling movement between the tool and blank about the axis of the cradle, which represents the axis of the crown gear to which the gear is to be generated conjugate, while imparting the necessary cutting motion to the tool to produce the desired lengthwise tooth shape. In some instances, it may be desirable to offset the axis of the blank from the axis of the cradle in addition to offsetting its apex. Preferably the two members of a gear pair are cut conjugate to crown gears which are identical except for hand of tooth curvature and whose apexes are equally offset from the apexes of the two blanks during generation.

When a pair of gears are cut according to the method of this invention, they will transmit uniform motion but their mating tooth surfaces will have less than full length tooth bearing and so the desired adjustability of the gears in use will result.

In the drawings:

Fig. 6 is a plan view illustrating diagrammatically the method of hobbing a spiral bevel pinion according to the present invention;

Fig. 7 is a plan view illustrating diagrammatically the method of hobbing the mating spiral bevel gear according to the principles of this invention;

Fig. 8 is a side elevation, more or less diagrammatic of the hob and pinion shown in Fig. 6; and Fig. 9 is a side elevation of a gear tooth, showing the typical tooth bearing of a pair of gears cut according to the principles of this invention.

Figure 1:
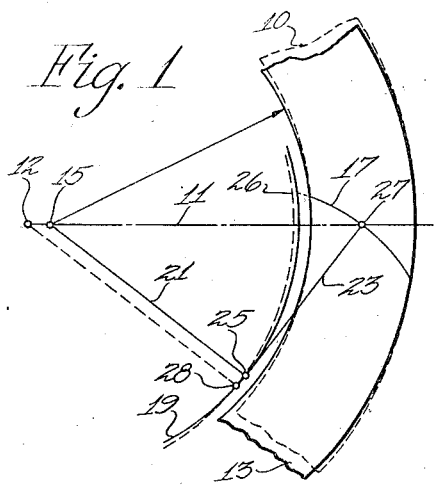
Fig. 1 is a plan view, illustrating diagrammatically the relation of a gear blank and crown gear in the cutting of a gear according to one embodiment of this invention.

In Fig. 1, 10 designates the bevel gear to be cut which is here shown fragmentarily and in development. The axis of this gear is denoted at 11 and its apex at 12.

Heretofore it has been the practice to generate such a gear conjugate to a crown gear whose axis intersects the blank axis in the blank apex 12 and whose apex coincides with this blank apex. With the present invention, both members of a spiral bevel gear pair are generated conjugate to crown gears whose apexes are offset from the apexes of the two blanks from which the two gears are to be cut.

In the modification of the invention illustrated in Fig. 1, the gear 10 is generated conjugate to a crown gear 13 whose axis intersects the gear axis 11 in a point 15 offset from the gear apex 12. Such a crown gear may have teeth of true involute lengthwise curvature, of modified involute lengthwise curvature, or of circular arcuate curvature, approximating either of these forms of general involute curves. The curvature of the teeth of the gear produced will conform, of course, to the curvature of the teeth of the crown gear.

In Fig. 1, 17 denotes the lengthwise tooth curve of one of the teeth of the crown gear. The normal to this curve at mean point 27 of the face of the crown gear is denoted at 23. This normal 23 is tangent to a circle 19 which is circumscribed about the point 15 and which for a crown gear having teeth of involute lengthwise curvature or of modified involute lengthwise curvature would be the base-circle or modified base-circle of the crown gear. The radius of this circle is designated at 21, and the line 23 is tangent to this circle at the point 25.

It will be noted that the line 23 is also tangent to a circle 26 which is circumscribed about the point 12 as a center and that the point 28 of tangency of the line 23 to the circle 26 is spaced a relatively small distance from the point 25 of tangency of the line 23 with the circle 19. The tooth curve 17 of the crown gear 13, therefore, will have the same direction at the center of the tooth face as the tooth curve of a crown gear whose axis intersects the axis 11 of the blank in the point 12 and whose base circle or modified base circle is denoted at 26.

During generation of the gear 10, a cutting motion is imparted to the tool to produce the required lengthwise tooth shape 17 and the tool and blank are rolled together as though the gear 10 were meshing with the crown gear 13. The pinion 35 (Fig. 2), which is to mesh with the gear 10, is generated conjugate to another crown gear whose axis intersects the axis of the pinion in a point offset from the pinion apex and this second crown gear will be identical with the crown gear 13 except for the fact that it will be of opposite hand. In generation of the pinion, the pinion blank will be so adjusted that the axis of the crown gear to which it is to be generated conjugate will intersect the pinion axis at a point offset from the pinion apex. The offset of the axis 30 of the crown gear from apex 12 is the same or approximately the same for both gear and pinion.

Figure 2:
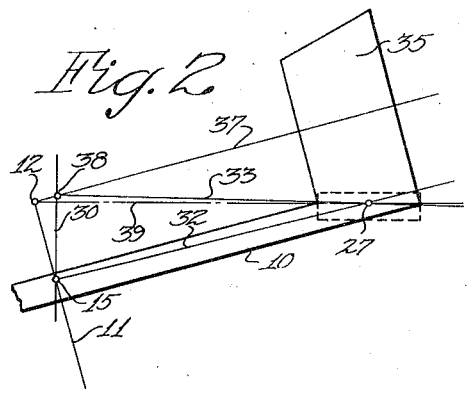
Fig. 2 is a side elevational view showing diagrammatically a pair of gears cut according to this invention in mesh and illustrating diagrammatically the principles upon which the invention rests.

The principles underlying the present invention will be understood from Fig. 2. When a pair of bevel gears, such as the gear 10 and pinion 35, are rotating in mesh, their axes 11 and 37 will intersect in a common apex 12 and the instantaneous axis of motion of the teeth of the gear will be the line 39 connecting a mean point of contact 27 of the teeth with the common apex 12. When the gear 10 is generated conjugate to a crown gear whose axis 30 intersects the gear axis in a point 15 offset from the gear apex 12, the instantaneous axis of generation of the gear will be at 32, which is the line connecting the mean point of contact 27 with the point 15. Likewise, when the pinion 35 is generated conjugate to a crown gear whose axis is at 30 intersecting the pinion axis 37 in a point 38 offset from the pinion apex 12, the instantaneous axis of generation of the pinion will be at 33, the line connecting the mean contact point 27 with the point 38. It will be seen, then, that during generation, the gear 10 and pinion 35 have instantaneous axes of generation which are different from one another and which are different from the instantaneous axis 39 of mesh of the gears.

It is because of this difference in position of the instantaneous axis of the gears when in mesh from the positions of the instantaneous axes during generation that the gears will not have full length tooth contact but will have a localized tooth bearing. The gears will transmit uniform motion because they are generated conjugate to complementary crown gears.

Figure 3:
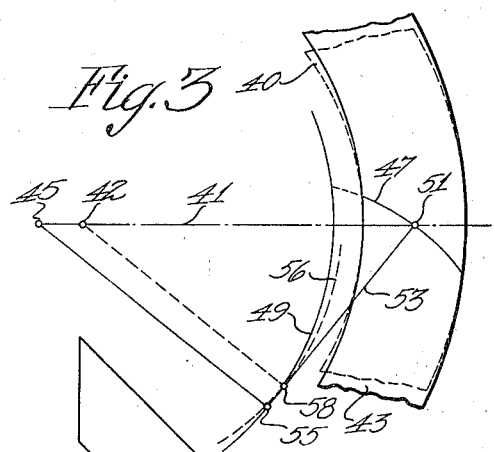
Fig. 3 is a plan view illustrating diagrammatically the method of cutting a gear according to a slightly different embodiment of this invention.
Figure 4:
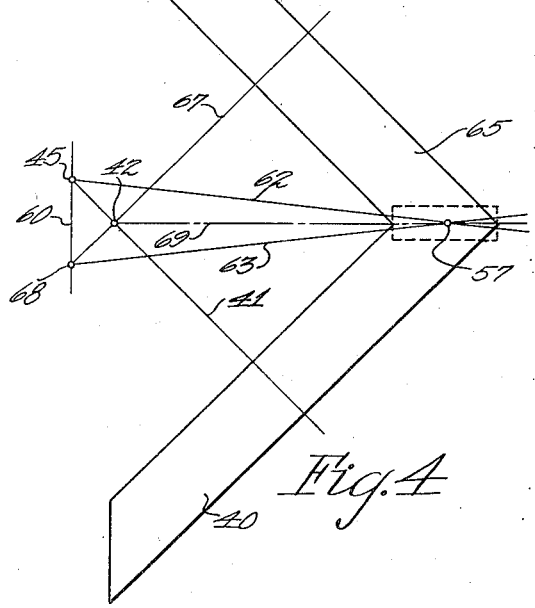
Fig. 4 is a diagrammatic side elevation of a pair of miter gears cut according to this latter embodiment of this invention and further illustrating the principles of the invention.

Figs. 3 and 4 illustrate a modification of the invention. Here a pair of miter gears are shown and each is generated conjugate to a crown gear whose axis intersects the gear axis in a point which lies beyond the gear apex rather than between the gear apex and the mean point of tooth contact.

Thus, in Fig. 3, 40 is a fragmentary development of the gear to be generated. Its axis projects into the line 41 and its apex is at 42. 43 denotes the crown gear to which the gear is to be generated conjugate. The apex of this crown gear is at 45 offset from the gear apex 42. The teeth of the crown gear are curved along curves one of which is shown at 47. A tooth normal is indicated at 53 tangent at point 55 to the circle 49 circumscribed about the crown gear axis 45. This tooth normal is also tangent at 58 to the circle 56 circumscribed about the gear apex 42. In other words, the tooth curve 47 of the crown gear whose axis is at 45 at the center of the tooth face will have the same direction as the tooth curve of a crown gear whose axis intersects the gear axis 41 in the gear apex 42 and whose base circle or modified base circle is denoted at 56.

During generation of the gear 43, as before, a cutting motion is imparted to the tool to produce the lengthwise tooth shape 47 and simultaneously the gear and tool are rolled together as though the gear 40 were rolling with the crown gear 43. The mating gear 65 of the pair is generated in a similar way, conjugate to a crown gear whose axis is offset from its apex and beyond its apex.

When the gears 40 and 65 are in mesh, their axes 41 and 67 intersect in their common apex 42 and their instantaneous axis of motion is at 69, the line connecting the mean contact point 57 with the common apex 42. During generation of the gear 40, however, the gear is generated, as described, conjugate to a crown gear whose axis is at 60 intersecting the gear axis 41 in a point 45 offset from the gear apex 42 and hence the instantaneous axis of generation of the tooth surfaces of the gear is at 62, offset from the instantaneous axis of mesh 69. Likewise, when the mating gear 65 is generated conjugate to a crown gear whose axis is at 60 intersecting the axis 67 of the gear 65 in a point 68 offset from the gear apex 42, the instantaneous axis of generation of the gear 65 will be in the line 63 offset from the instantaneous axis 69 of mesh. It is this difference in the directions of the instantaneous axes during generation that results in the localized tooth bearing, which is the object of the present invention, when the gears are run together in mesh.

Figure 5:
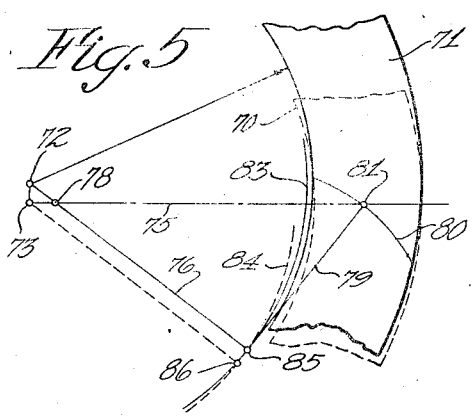
Fig. 5 is a fragmentary plan view illustrating diagrammatically the relation of gear and crown gear in still another embodiment of this invention.

While the pair may be generated as already described conjugate to crown gears whose apexes are offset from the apexes of the gear but whose axes intersect the axes of the gear, it is also possible to generate the gears conjugate to crown gears whose apexes are not only offset from the apexes of the gears but whose axes are also offset from the axes of the gear. This modification of my invention is illustrated diagrammatically in Fig. 5.

Here the bevel gear to be generated is shown fragmentarily and in development at 70. The crown gear to which the gear is generated conjugate is indicated at 71. The axis of the gear 70 is denoted at 75 and its apex at 73. The apex and axis of the crown gear is denoted at 72. Thus, the axis of the crown gear is offset from the axis of the blank and the apex of the crown gear is offset from the apex of the blank.

I have already shown that if the gear 70 were to be generated, conjugate to a crown gear whose axis intersected the axis 75 of the gear in a point 78 offset from the gear apex 73, a tooth curve would be produced on the gear which at a mean point 81 of the face of the gear would contact with and have the same direction as the tooth curve 80 of the crown gear. It is well known from the principles of kinematic and it has been demonstrated in numerous of my prior patents that when the center of generation is displaced in a direction perpendicular to the tooth normal, that is, in a direction tangent to the tooth curve, the tooth curve is practically unaffected providing that the ratio of roll is selected. It follows, then, that when the apex of the crown gear is displaced from the point 78 to the point 72 along the line 76 perpendicular to the tooth normal, 79, a curve will be produced on the gear which is practically identical with the tooth curve 80 which would be produced on the gear were it generated conjugate to a crown gear whose center was at 78. The normal 79 to the tooth curve 80 is tangent to the circle 83 circumscribed about the apex 72 at a point 85 and it is also tangent to the circle 84 circumscribed about the gear apex 73 at a point 86. Therefore, a tooth curve produced on the gear 70 will have the same direction at the center of the face of the gear as a curve produced on the gear were the gear to be generated conjugate to a crown gear whose axis intersected the axis of the gear in the gear apex 73 and whose base circle or modified base circle were represented by the circle 84.

In any of the modifications of my invention, the teeth may be cut into the gear with any suitable form of tool. Thus, gears may be cut with a face-mill or a tool reciprocating in a circular arcuate path where the radius approximates the radius of an involute or modified involute curve. The gears may also be cut with a reciprocating tool according to the method described in the Taylor U. S. Patent No. 1,478,188 of December 18, 1923. The invention, however, is of primary importance in the field of hobbing spiral bevel gears because, as stated, heretofore one of the most serious drawbacks to the hobbing of spiral bevel gears has been the practical difficulty of hobbing such gears so that they will mesh with a localized tooth bearing.

Figs. 6 to 8 inclusive illustrate the method of hobbing a pair of spiral bevel gears according to the present invention. Figs. 6 and 8 show the hobbing of the pinion or smaller member of the pair.

The pinion is designated at 85 and the hob which is used to cut this pinion and which is here shown as a taper hob of constant pitch is denoted at 86. According to the principles of this invention, the pinion 85 is generated conjugate to a crown gear 87 whose axis intersects the pinion axis 89 in a point 88 which is offset from the pinion apex 90.

The hob is positioned so as to represent the crown gear 87 and is positioned so that its axis 92 extends diagonally across the tooth-zone of the crown gear. In cutting the pinion, the hob 86 is rotated on its axis 92 in timed relation with the pinion 85 which is rotated continuously on its axis 89 and simultaneously a relative rolling motion is produced between the hob and pinion about the axis 88 of the crown gear. The ratio of roll must correspond to the new position of the instantaneous axis as well known.

The gear 95 which is to mesh with pinion 86 is generated in a manner similar to the generation of the pinion. A hob 96 is used which may be identical with the hob 86 except for hand of thread. The gear 95 will be so positioned that the axis of the crown gear will intersect the axis 99 of the gear in a point 96 offset from the gear apex 97 the same distance as the point 88 is offset from the apex 90 of the pinion in generation of the pinion. The hob 96 is positioned to represent the crown gear 100 with its axis 102 extending diagonally of the face of the crown gear.

The gear teeth are generated by rotating the hob 96 in engagement with the gear blank 95 in timed relation and simultaneously producing a relative rolling motion between the hob and blank about the axis 99 of the crown gear.

Except for the fact that in the generation of both gear and pinion, the apexes of the blanks are offset from the axis of the crown gear, both gear and pinion may be generated according to the basic principles set forth in the U. S. patent to Trbojevich, Reissue No. 16,173 of September 22, 1925. In this case the hobs are positioned both for cutting of the gear and the pinion so that the hob-apex lies on a line perpendicular to the axes of hob and crown gear. This method of positioning the hob is illustrated both in Figs. 6 and 7. In Fig. 6, the hob apex 93 is on a line 94 perpendicular to the axes 92 and 88, respectively, of the hob and crown gear. In Fig. 7, the hob apex 103 is on a line 104 perpendicular to the axes 102 and 99, respectively, of the hob and crown gear. In Fig. 6 the hob is shown in a position at the beginning of the roll and in Fig. 7 the hob is shown in a position at the middle of the generating roll.

With the present invention, a localized tooth bearing will be obtained on the teeth of mating gears such as is shown by the shaded portion 110 of the tooth surface 111 in Fig. 9.

A further feature of the present invention is the increased strength of the teeth of the gear as compared with teeth of gears hobbed by processes heretofore used. When a gear is generated as shown in Figs. 1 and 2 and 6 and 7 conjugate to a crown gear whose axis intersects the blank axis in a point offset from the gear apex but between the gear apex and a mean point of contact, the pressure angle of the teeth at their inner ends is increased over the pressure angle of teeth generated according to previously used methods. Thus undercut at the small end of the tooth is avoided.

While the invention has been described in connection with a process in which both members of a pair of spiral bevel gears are generated conjugate to crown gears which are identical except for hand of tooth curvature and whose axes are offset equal amounts from the apexes of the gears during generation, it will be understood that in some instances it may be desirable to offset the axis of one of the crown gears from the apex of the gear being generated a greater distance in the case of one of the gears than in the case of the other.

Other modifications of the invention will occur to those skilled in the art. In general, the present application is intended to cover any variations, uses or adaptations of the invention following in general, the principles of the invention and including such departures from the present disclosure as come within known or customary practice in the gear art and as may be applied to the essential features hereinbefore set forth and as fall within the scope of the invention or the limits of the appended claims.

Having thus described my invention, what I claim is:

1. The method of hobbing a pair of spiral bevel gears to have mating tooth surfaces which have less than full length tooth contact which comprises cutting the tooth surfaces of each member of the pair with a hob of constant pitch by rotating the hob in timed relation with the gear blank while rotating the blank on its axis and simultaneously producing a relative rolling movement between the hob and blank as though the blank were meshing with a crown gear, represented by the hob, whose axis is offset from the apex of the blank.

2. The method of hobbing a pair of spiral bevel gears to have mating tooth surfaces which have less than full length tooth contact which comprises cutting the tooth surfaces of each member of the pair with a hob of constant pitch by rotating the hob in timed relation with the gear blank while rotating the blank on its axis and simultaneously producing a relative rolling movement between the hob and blank as though the blank were meshing with a crown gear, represented by the hob, whose axis intersects the axis of the blank and is offset from the apex of the blank.

3. The method of hobbing a pair of spiral bevel gears to have mating tooth surfaces which have less than full length tooth contact which comprises cutting the tooth surfaces of each member of the pair with a hob of constant pitch by rotating the hob in timed relation with the gear blank while rotating the blank on its axis and simultaneously producing a relative rolling movement between the hob and blank as though the blank were meshing with a crown gear, represented by the hob, whose axis is offset from the axis of the blank.

4. The method of generating a spiral bevel gear which comprises cutting its tooth surfaces with a hob of constant pitch by rotating the hob in timed relation with the gear blank while rotating the blank continuously on its axis and simultaneously producing a relative rolling movement between the hob and blank about an axis offset from the apex of the blank.

5. The method of generating a spiral bevel gear which comprises cutting its tooth surfaces with a hob of constant pitch by rotating the hob in timed relation with the gear blank while rotating the blank continuously on its axis and simultaneously producing a relative rolling movement between the hob and blank about an axis which intersects the axis of the blank and is offset from the apex of the blank.

6. The method of generating a spiral bevel gear which comprises cutting its tooth surfaces with a hob of constant pitch by rotating the hob in timed relation with the gear blank while rotating the blank continuously on its axis and simultaneously producing a relative rolling movement between the hob and blank about an axis offset from the axis of the blank.

7. The method of generating a pair of spiral bevel gears so that mating tooth surfaces of the gears will have less than full length tooth contact when in mesh which comprises generating the two members of the pair conjugate to complementary crown gears, each of which has tooth surfaces whose pitch line elements are of general involute lengthwise curvature and identical on opposite sides of the teeth and whose axes are offset from the apexes of the respective gears.

8. The method of generating a pair of spiral bevel gears so that mating tooth surfaces of the gears will have less than full length tooth contact when in mesh which comprises generating the two members of the pair conjugate to complementary crown gears, each of which has tooth surfaces whose pitch line elements are of involute lengthwise curvature and identical on the opposite sides of its teeth, and whose axes intersect the axes of the respective gears in points offset from the apexes of the gears.

9. The method of generating a pair of spiral bevel gears so that mating tooth surfaces of the gears will have less than full length tooth contact when in mesh which comprises generating the two members of the pair conjugate to complementary crown gears, each of which has tooth surfaces whose pitch line elements are of involute lengthwise curvature and identical on opposite sides of the teeth, and whose axes are offset from the axes of the respective gears.

ERNEST WILDHABER.